(12) United States Patent
Rogunova

(10) Patent No.: US 7,977,415 B2
(45) Date of Patent: *Jul. 12, 2011

(54) IMPACT RESISTANT, FLAME RETARDANT THERMOPLASTIC MOLDING COMPOSITION

(75) Inventor: Marina Rogunova, Pittsburgh, PA (US)

(73) Assignee: Bayer MaterialScience LLC, Pittsuburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/998,697

(22) Filed: Nov. 30, 2007

(65) Prior Publication Data

US 2009/0143514 A1    Jun. 4, 2009

(51) Int. Cl.
  *C08K 5/49* (2006.01)
  *C09D 151/00* (2006.01)
  *C08G 18/42* (2006.01)

(52) U.S. Cl. ........ 524/121; 524/123; 524/126; 524/127; 524/500; 523/201; 523/205

(58) Field of Classification Search .................. 523/201, 523/205; 524/127, 141, 145, 430, 115, 121, 524/123, 126, 183, 437, 500, 504; 525/63, 525/64, 67, 148
See application file for complete search history.

(56) References Cited

U.S. PATENT DOCUMENTS

| | | | |
|---|---|---|---|
| 4,339,556 A | 7/1982 | Baer | |
| 4,824,723 A | 4/1989 | Campbell et al. | |
| 4,859,740 A * | 8/1989 | Damrath et al. | 525/100 |
| 4,888,388 A * | 12/1989 | Hongo et al. | 525/67 |
| 4,963,619 A | 10/1990 | Wittmann et al. | |
| 5,153,251 A | 10/1992 | Lupinski et al. | |
| 5,266,618 A | 11/1993 | Watanabe et al. | |
| 6,423,766 B1 | 7/2002 | Itagaki | |
| 6,569,930 B1 * | 5/2003 | Eckel et al. | 524/127 |
| 6,596,800 B1 | 7/2003 | Zobel et al. | |
| 6,767,944 B2 | 7/2004 | Zobel et al. | |
| 7,067,567 B2 * | 6/2006 | Seidel et al. | 523/201 |
| 7,081,490 B2 | 7/2006 | Warth et al. | |
| 2004/0059031 A1 | 3/2004 | Seidel et al. | |
| 2007/0060678 A1 | 3/2007 | Wenz et al. | |

FOREIGN PATENT DOCUMENTS

| | | | |
|---|---|---|---|
| EP | 525955 A1 * | 2/1993 | |
| EP | 1529810 A1 * | 5/2005 | |
| JP | 04345657 A | 12/1992 | |
| JP | 07316409 A | 12/1995 | |
| JP | 08259791 A | 10/1996 | |
| JP | 2001031860 A | 2/2001 | |

OTHER PUBLICATIONS

Australian National Industrial Chemicals Notiication and Assessment Scheme Full Public Report for Metablen S2001, Sep. 1997.*

* cited by examiner

*Primary Examiner* — Vasu Jagannathan
*Assistant Examiner* — Hannah Pak
(74) *Attorney, Agent, or Firm* — John E. Mrozinski, Jr.; Noland J. Cheung

(57) ABSTRACT

A thermoplastic molding composition characterized by its flame retardance and impact strength is disclosed. The composition contains (A) linear aromatic (co)polycarbonate, (B) a graft (co)polymer having core-shell morphology, the shell containing polymerized alkyl(meth)acrylate and the core containing interpenetrated and inseparable polyorganosiloxane and poly(meth)alkyl acrylate components, (C) a phosphorous-containing flame retardant compound, (D) fluorinated polyolefin and (E) a boron compound, and optionally SAN. The composition is further characterized in that it contains no polyalkylene terephthalate.

9 Claims, No Drawings

IMPACT RESISTANT, FLAME RETARDANT THERMOPLASTIC MOLDING COMPOSITION

FIELD OF THE INVENTION

The invention relates to thermoplastic molding compositions and in particular to impact-modified, flame retardant thermoplastic molding compositions that contain aromatic polycarbonate resin.

TECHNICAL BACKGROUND OF THE INVENTION

Impact-modified blends of polycarbonate are known. Also known are flame resistant polycarbonate compositions where the flame retarding agent is halogen-free.

The relevant art is noted to include JP 2001 031 860 that disclosed an impact strength composition, said to be hydrolytically stable and chemically resistant, containing polycarbonate, a graft elastomer having a core-shell structure and red phosphorus.

An impact modified thermoplastic molding composition containing polycarbonate and a graft (co)polymer wherein the graft base includes a rubber selected from a group that includes silicone-acrylate composite has been disclosed in U.S. Pat. No. 7,067,567. The graft (co)polymer is exemplified by methyl methacrylate-grafted silicone-butyl acrylate composite rubber. An impact resistance composition containing polycarbonate and graft polymer based on a silicone-butyl acrylate composite rubber is disclosed in U.S. Pat. No. 4,888,388.

A flame retardant, chemically resistant and thermally stable composition containing a halogenated aromatic polycarbonate resin, aromatic polyester resin, and graft rubber polymer composite is disclosed in JP 04 345 657. The graft rubber is said to be obtained by grafting vinyl monomer(s) onto rubber particles consisting of a poly-organosiloxane rubber and a polyalkyl (meth)acrylate rubber entangled so as not to be separated from each other.

JP8259791 is considered to disclose a flame-retardant resin composition said to feature excellent impact resistance and flame retardance and containing polycarbonate resin with a phosphoric ester compound and a specific composite-rubber-based graft copolymer. The composite-rubber-based graft copolymer is obtained by grafting at least one vinyl monomer (e.g. methyl methacrylate) onto a composite rubber that contains 30-99% polyorganosiloxane component and 70-1% of poly alkyl (meth)acrylate rubber component.

JP 7316409 disclosed a composition having good impact resistance and flame retardance containing polycarbonate, phosphoric ester and a specified graft copolymer based on a composite rubber. The graft copolymer is obtained by graft polymerization of one or more vinyl monomers onto a composite rubber in which polyorganosiloxane component and polyalkyl (meth)acrylate rubber component are entangled together so as not to be separable.

U.S. Pat. No. 4,824,723 disclosed a flame retardant material that contains polycarbonate and a flame retardant. Phosphorous compounds alone or in combination with zinc salt is referred to among the disclosed flame retardants.

U.S. Pat. No. 4,963,619 disclosed a thermoplastic polycarbonate molding composition containing polycarbonates, siloxane-containing graft polymers and, optionally, other thermoplasts and/or standard additives. The composition is said to feature high toughness, particularly at low temperatures.

U.S. Pat. No 6,423,766 disclosed a flame-retardant polycarbonate resin composition, containing polycarbonate resin, a composite rubbery graft copolymer, a halogen-free phosphoric ester and polytetrafluoroethylene. The composition is said to exhibit improved mechanical properties, moldability, flowability, and flame retardance. The graft rubber is based on polyorganosiloxane rubber component and polyalkyl acrylate rubber component and the two components are intertwisted and inseparable from each other. The grafted rubber is grafted with one or more vinyl monomers.

A flame retardant resin composition containing polycarbonates, a halogenated flame-retardant, and a rubber-occluded flame retardant synergist has been disclosed in U.S. Pat. No. 4,339,556. Zinc borate is disclosed among the suitable flame retardant synergists.

A flame retardant polycarbonate composition exhibiting reduced heat release rate has been disclosed in U.S. Pat. No. 5,153,251. The composition contains a blend of polydiorganosiloxane fluid and calcined clay. Zinc borate is disclosed as an additive to impart improved flame drip properties. U.S. Pat. No. 5,266,618 disclosed a flame-retardant resin composition that contains polycarbonate resin, an optional graft polymer, a phosphorus compound, a boron compound, and polyorganosiloxane. A thermoplastic molding composition that contains polycarbonate, vinyl copolymer, graft polymer, and a finely divided compound selected from the group consisting of zinc sulfide, zinc phosphate, zinc borate and zinc sulfate is disclosed in U.S. Pat. No. 6,596,800 to exhibit improved mechanical properties.

Currently pending patent application Ser. No. 11/713,352, filed Mar. 2, 2007 assigned to the present assignee disclosed compositions containing presently relevant components.

SUMMARY OF THE INVENTION

A thermoplastic molding composition characterized by its flame retardance and impact strength is disclosed. The composition contains (A) linear aromatic (co)polycarbonate, (B) a graft (co)polymer having core-shell morphology, the shell containing polymerized alkyl(meth)acrylate and the core containing interpenetrated and inseparable polyorganosiloxane and poly(meth)alkyl acrylate components, (C) a phosphorous-containing flame retardant compound, (D) fluorinated polyolefin and (E) a boron compound. The composition is further characterized in that it contains no polyalkylene terephthalate.

DETAILED DESCRIPTION OF THE INVENTION

The inventive composition that features exceptional flame retardance and impact strength contains A) 50 to 95 percent by weight (pbw), preferably 65 to 90 pbw, most preferably 70 to 85 pbw of linear aromatic (co)polycarbonate having a weight-average molecular weight of at least 25,000 preferably at least 26,000 g/mol., B) 1 to 15 preferably 3 to 12, more preferably 5 to 8 pbw of a graft (co)polymer having a core-shell morphology, comprising a grafted shell that contains polymerized alkyl (meth)acrylate and a composite rubber core that contains interpenetrated and inseparable polyorganosiloxane and poly(meth)alkyl acrylate components, where the weight ratio of polyorganosiloxane to poly(meth)alkylacrylate to rigid shell is 70-90/5-15/5-15, and C) 2 to 20, preferably 5 to 15, particularly preferably 7 to 15, most preferably 10 to 13 pbw of a phosphorus-containing compound, preferably organic phosphoric or phosphonic acid ester, and D) 0.1 to 2, preferably 0.2 to 1, most preferably 0.2 to 0.5 pbw of fluorinated polyolefin, and E) 0.1 to 15, preferably 1 to 10, most preferably 1 to 5 pbw of a boron compound, preferably zinc borate, the percents, all occurrences being relative to the weight of the composition, with the proviso that polyalkylene terephthalate is not included.

Any numerical range recited herein is intended to include all sub-ranges subsumed therein.

Component A

Suitable linear aromatic (co)polycarbonates (including linear aromatic polyestercarbonates) are known. Such (co)polycarbonates may be prepared by known processes (see for instance Schnell's "Chemistry and Physics of Polycarbonates", Interscience Publishers, 1964) and are widely available in commerce, for instance Makrolon® polycarbonate a product of Bayer MaterialScience.

Aromatic polycarbonates may be prepared by the known melt process or the phase boundary process.

Aromatic dihydroxy compounds suitable for the preparation of aromatic polycarbonates and/or aromatic polyester carbonates conform to formula (I)

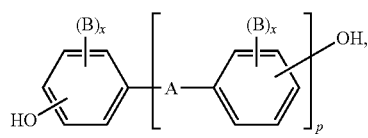

(I)

wherein

A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

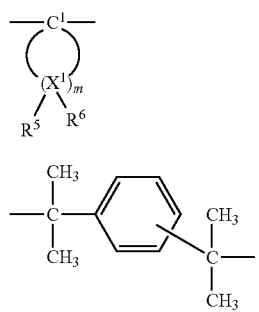

(II)

(III)

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropylbenzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxphenyl)-propane (bisphenol A). These compounds may be used individually or in the form of any desired mixtures.

Chain terminators suitable for the preparation of thermoplastic aromatic polycarbonates include phenol, p-chlorophenol, p-tert.-butylphenol, as well as long-chained alkylphenols, such as 4-(1,3-tetra-methylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used.

The suitable linear (co)polycarbonates include polyestercarbonates, including such as are disclosed in U.S. Pat. Nos. 4,334,053; 6,566,428 and in CA 1173998, all incorporated herein by reference. Aromatic dicarboxylic acid dihalides for the preparation of the suitable aromatic polyestercarbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1.

The content of carbonate structural units in the thermoplastic aromatic polyestercarbonates is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The thermoplastic linear aromatic poly(ester) carbonates have weight-average molecular weights (measured by gel permeation chromatography) of at least 25,000, preferably at least 26,000. The thermoplastic aromatic poly(ester) carbonates may be used alone or in any desired mixture.

The amount of component A in the inventive composition is 53 to 96.8 percent by weight (pbw), advantageously 65 to 90.8, most preferably 73.5 to 83.8 pbw relative to the weight of the composition.

Component B

Component B is at least one graft polymer of

B.1 from 5 to 95 wt. %, preferably from 10 to 90 wt. %, of one or more vinyl monomers on B.2 from 95 to 5 wt. %, preferably from 90 to 10 wt. %, of one or more graft bases selected from the group of the silicone rubbers (B.2.1) and silicone acrylate rubbers (B.2.2).

The graft copolymer B may be prepared by free-radical polymerization, for example by emulsion, suspension, solution or mass polymerization, preferably by emulsion or mass polymerization.

Suitable monomers B.1 include vinyl monomers such as vinyl aromatic compounds and/or ring-substituted vinyl aromatic compounds (e.g. styrene, α-methylstyrene, p-methylstyrene, p-chlorostyrene), methacrylic acid ($C_1$-$C_8$)-alkyl esters (e.g. methyl methacrylate, ethyl methacrylate, 2-ethylhexyl methacrylate, allyl methacrylate), acrylic acid ($C_1$-$C_8$)- alkyl esters (e.g. methyl acrylate, ethyl acrylate, n-butyl acrylate, tert-butyl acrylate), organic acids (e.g. acrylic acid, methacrylic acid) and/or vinyl cyanides (e.g. acrylonitrile and methacrylonitrile) and/or derivatives (e.g. anhydrides and imides) of unsaturated carboxylic acids (e.g. maleic anhydride and N-phenyl-maleimide). These vinyl monomers may be used alone or as mixtures of at least two monomers.

The preferred monomers of B.1 are styrene, α-methylstyrene, methyl methacrylate, n-butyl acrylate and acrylonitrile. Particularly preferred monomer B.1 is methyl methacrylate as the monomer.

The glass transition temperature of the graft base B.2 is lower than 10° C., preferably lower than 0° C., particularly preferably lower than −20° C. The graft base B.2 has a median particle size ($d_{50}$ value) of from 0.05 to 10 μm, preferably from 0.06 to 5 μm, particularly preferably from 0.08 to 1 μm. The diameter which differentiates between two equal parts by weight of a given sample of particulate matter, one part containing all particles larger than that diameter and the other part containing all grains smaller is the median diameter. It can be determined by means of ultracentrifuge measurement (W. Scholtan, H. Lange, Kolloid, Z. und Z. Polymere 250 (1972), 782-1796).

Suitable silicone rubbers according to B.2.1 are silicone rubbers having graft-active sites, the preparation method of which is described, for example, in U.S. Pat. No. 2,891,920, U.S. Pat. No. 3,294,725, DE-OS 3 631 540, EP 249964, EP 430134 and U.S. Pat. No. 4,888,388, all incorporated herein by reference. It is preferably prepared by emulsion polymerization, in which siloxane monomeric structural units, crosslinking or branching agents and optionally grafting agents are used.

Suitable siloxane monomeric structural units include dimethylsiloxane or cyclic organosiloxanes having at least 3 ring members, preferably from 3 to 6 ring members, for example hexamethylcyclotrisiloxane, octamethylcyclotetrasiloxane, decamethylcyclopentasiloxane, dodecamethylcyclohexasiloxane, trimethyl-triphenyl-cyclotrisiloxane, tetramethyl-tetraphenyl-cyclotetrasiloxane, octaphenylcyclotetrasiloxane. These organosiloxane monomers may be used alone or as mixtures of two or more monomers. The silicone rubber preferably contains not less than 50 wt. % and particularly preferably not less than 60 wt. % organosiloxane, based on the total weight of the silicone rubber component.

Examples of crosslinking or branching agents include silane-based crosslinking agents having a functionality of 3 or 4, particularly preferably 4. Preferred agents include trimethoxymethylsilane, triethoxyphenylsilane, tetramethoxysilane, tetraethoxysilane, tetra-n-propoxysilane and tetrabutoxysilane. Crosslinking agent may be used alone or in a mixture of two or more crosslinking agents. Tetraethoxysilane is particularly preferred.

The crosslinking agent may be used in an amount of 0.1 to 40 wt. %, based on the total weight of the silicone rubber component. The amount of crosslinking agent is selected so that the degree of swelling of the silicone rubber, measured in toluene, is from 3 to 30, preferably from 3 to 25 and particularly preferably from 3 to 15. The degree of swelling is defined as the weight ratio of the amount of toluene absorbed by the silicone rubber when it is saturated with toluene at 25° C., and the amount of silicone rubber in the dry state. The determination of the degree of swelling is described in detail in U.S. Pat. No. 4,877,831, incorporated herein by reference.

Suitable grafting agents are compounds that are capable of forming structures having the following formulae:

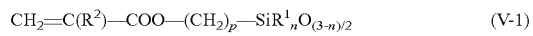

$$CH_2=C(R^2)-COO-(CH_2)_p-SiR^1_nO_{(3-n)/2} \qquad (V-1)$$

$$CH_2=CH-SiR^1_nO_{(3-n)/2} \qquad (V-2) \text{ or}$$

$$HS-(CH_2)_p-SiR^1_nO_{(3-n)/2} \qquad (V-3),$$

wherein
$R^1$ is $C_1$-$C_4$-alkyl, preferably methyl, ethyl or propyl, or phenyl,
$R^2$ is hydrogen or methyl,
n is 0, 1 or 2 and
p is 1 to 6.

Preferred examples include: β-methacryloyloxy-ethyidimethoxymethyl-silane, γ-methacryloyloxy-propylmethoxydimethyl-silane, γ-methacryloyloxy-propyldimethoxymethyl-silane, γ-methacryloyloxy-propyltrimethoxy-silane, γ-methacryloyloxy-propylethoxydiethyl-silane, γ-methacryloyloxy-propyldiethoxymethyl-silane, δ-methacryloyl-oxy-butyldiethoxymethyl-silane or mixtures thereof. From 0 to 20 wt. % of grafting agent may be used, based on the total weight of the silicone rubber.

The silicone rubber may be prepared by emulsion polymerization, as described, for example, in U.S. Pat. Nos. 2,891,920 and 3,294,725. The silicone rubber is thereby obtained in the form of aqueous latex. To that end, a mixture containing organosiloxane, crosslinking agent and optionally grafting agent is mixed with water, under shear, for example by means of a homogenizer, in the presence of an emulsifier based on sulfonic acid, such as, for example, alkylbenzenesulfonic acid or alkylsulfonic acid, the mixture polymerizing completely to form the silicone rubber latex. An alkylbenzenesulfonic acid is particularly suitable because it acts not only as emulsifier but also as polymerization initiator. In this case, a combination of the sulfonic acid with a metal salt of an alkylbenzenesulfonic acid or with a metal salt of an alkylsulfonic acid is advantageous because the polymer is stabilized thereby during the subsequent graft polymerization.

After the polymerization, the reaction is terminated by neutralizing the reaction mixture by addition of an aqueous alkaline solution, for example by addition of an aqueous sodium hydroxide, potassium hydroxide or sodium carbonate solution.

Silicone acrylate rubbers (B.2.2) are also suitable as graft bases B.2. These rubbers are composite rubbers having graft-active sites and containing from 10 to 90 wt. % silicone rubber component and from 90 to 10 wt. % polyalkyl (meth)acrylate rubber component, the two mentioned rubber components in the composite rubber interpenetrating so that they cannot substantially be separated from one another.

Silicone acrylate rubbers are known and are described, for example, in U.S. Pat. Nos. 5,807,914, and 4,888,388, both incorporated herein by reference.

Suitable silicone rubber components therefor are those as already described under B.2.1.

Suitable polyalkyl (meth)acrylate rubber components of the silicone acrylate rubbers according to B.2.2 may be prepared from methacrylic acid alkyl esters and/or acrylic acid alkyl esters, a crosslinking agent and a grafting agent. Examples of preferred methacrylic acid alkyl esters and/or acrylic acid alkyl esters are $C_1$- to $C_8$-alkyl esters, for example methyl, ethyl, n-butyl, tert-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, as well as mixtures of these monomers. n-Butyl acrylate is particularly preferred.

As crosslinking agents for the polyalkyl (meth)acrylate rubber component of the silicone acrylate rubber there may be used monomers having more than one polymerizable double bond. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Examples of preferred grafting agents include allyl methacrylate, triallyl cyanurate, triallyl isocyanurate or mixtures thereof. Allyl methacrylate may also be used as crosslinking agent. The grafting agents may be used alone or in mixtures of at least two grafting agents.

The amount of crosslinking agent and grafting agent is from 0.1 to 20 wt. %, based on the total weight of the polyalkyl (meth)acrylate rubber component of the silicone acrylate rubber.

The silicone acrylate rubber may be produced by first preparing the silicone rubber (B.2.1) as aqueous latex. The latex may subsequently be enriched with the methacrylic acid alkyl esters and/or acrylic acid alkyl esters, the crosslinking agent and the grafting agent, and polymerization is carried out. Preference is given to emulsion polymerization initiated by free radicals, for example by a peroxide, azo or redox initiator. Particular preference is given to the use of a redox initiator system, in particular a sulfoxylate initiator system prepared by combining iron sulfate, disodium ethylenediamine tetraacetate, rongalite and hydroperoxide.

The grafting agent used in the preparation of the silicone rubber has the effect that the polyalkyl (meth)acrylate rubber component is bonded covalently to the silicone rubber component. In the polymerisation, the two rubber components interpenetrate and thus form the composite rubber, which after the polymerization can no longer be separated into its constituents of silicone rubber component and polyalkyl (meth)acrylate rubber component.

For the preparation of the silicone (acrylate) graft rubbers the monomers B.1 are grafted onto the rubber base B.2.

The polymerization methods are described, for example, in U.S. Pat. Nos. 4,877,831 and 4,888,388 and EP 430134, incorporated herein by reference.

The graft polymerization may be carried out, for example, according to the following polymerization method: In a single- or multi-step emulsion polymerization initiated by free radicals, the desired vinyl monomers B.1 are polymerized onto the graft base, which is in the form of aqueous latex. The grafting efficiency should be as high as possible and is preferably greater than or equal to 10%. The grafting efficiency is substantially dependent on the grafting agent or used. After polymerization to the silicone (acrylate) graft rubber, the aqueous latex is added to hot water in which metal salts have previously been dissolved, such as, for example, calcium chloride or magnesium sulfate. The silicone (acrylate) graft rubber thereby coagulates and may then be separated off.

The methacrylic acid alkyl ester and acrylic acid alkyl ester graft rubbers mentioned as component B) are commercially available, for example Metablen® SX 005 a product of Mitsubishi Rayon Co. Ltd.

The preferred graft (co)polymer suitable in the context of the invention has core/shell morphology. It may be obtained by graft polymerizing alkyl(meth)acrylate and optionally a copolymerizable vinyl monomer onto a composite rubber core. The composite rubber core that includes interpenetrated and inseparable network (IPN) polyorganosiloxane and poly(meth)alkyl acrylate components is characterized in that its glass transition temperature is below 0° C., preferably below −20° C., especially below −40° C.

The preferred core is polysiloxane-alkyl(meth)acrylate interpenetrating network (IPN) type polymer that contains polysiloxane and butylacrylate. The shell is a rigid phase, preferably polymerized of methylmethacrylate. The weight ratio of polysiloxane/alkyl(meth)acrylate/rigid shell is 70-90/5-15/5-15, preferably 75-85/7-12/7-12, most preferably 80/10/10.

Component C

Phosphorus-containing compounds suitable in the context of the invention include oligomeric organic phosphoric or phosphonic acid esters conforming structurally to formula (IV)

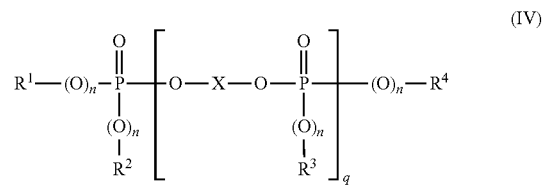

wherein
$R^1$, $R^2$, $R^3$ and $R^4$ independently one of the others, each represents $C_1$- to $C_8$-alkyl, or $C_5$-$C_6$-cycloalkyl, $C_6$-$_{20}$-aryl or $C_7$-$_{12}$-aralkyl each optionally substituted by alkyl, preferably by $C_1$-$_4$-alkyl,
n independently one of the others denotes 0 or 1, preferably 1,
q denotes 0.5 to 30, preferably 0.8 to 15, particularly preferably 1 to 5, especially 1 to 2, and
X is a mono- or poly-nuclear aromatic radical having from 6 to 30 carbon atoms, or an aliphatic radical having from 2 to 30 carbon atoms, which may be OH-substituted and may contain up to 8 ether bonds. The aliphatic radical may be linear or branched.

Preferably, $R^1$, $R^2$, $R^3$ and $R^4$ each independently of the others represents $C_1$-$_4$-alkyl, phenyl, naphthyl or phenyl-$C_1$-$_4$-alkyl. In the embodiments where any of $R^1$, $R^2$, $R^3$ and $R^4$ is aromatic, it may be substituted by alkyl groups, preferably by $C_1$-$_4$-alkyl. Particularly preferred aryl radicals are cresyl, phenyl, xylenyl, propylphenyl or butylphenyl.

In the preferred embodiment X represents a mono- or poly-nuclear aromatic radical having from 6 to 30 carbon atoms. It is preferably derived from any of the aromatic dihydroxy compounds of formula (I).

X particularly preferably represents at least one member selected from the group consisting of

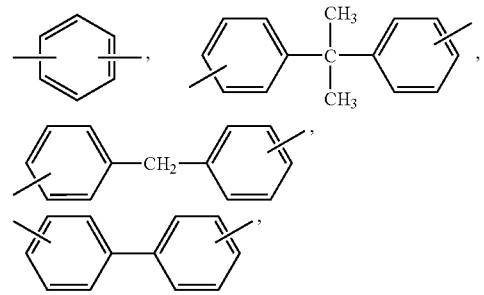

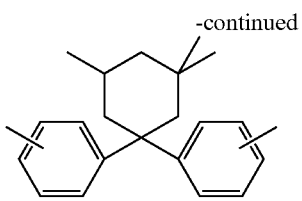

Especially, X may be derived from resorcinol, hydroquinone, bisphenol A or diphenylphenol and particularly preferably from bisphenol A.

Further suitable phosphorus-containing compounds are compounds of formula (IVa)

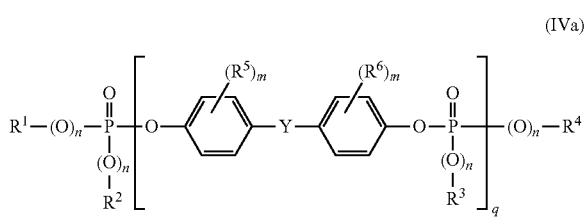

wherein
R$^1$, R$^2$, R$^3$, R$^4$, n and q are as defined for formula (IV),
m independently one of the others represents 0, 1, 2, 3 or 4,
R$^5$ and R$^6$ independently one of the others represents C$_{1-4}$-alkyl, preferably methyl or ethyl, and
Y represents C$_1$- to C$_7$-alkylidene, C$_{1-7}$-alkylene, C$_{5-12}$-cycloalkylene, C$_{5-12}$-cycloalkylidene, —O—, —S—, —SO$_2$— or —CO—, preferably isopropylidene or methylene.
Particularly preferred is

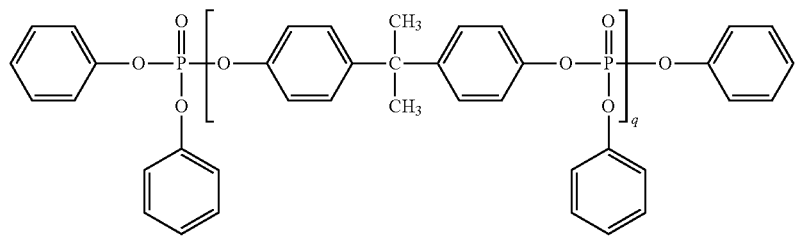

wherein q is 1 to 2.

Such phosphorus compounds are known (see, for example, U.S. Pat. Nos. 5,204,394 and 5,672,645, both incorporated herein by reference) or may be prepared by known methods (e.g. Ullmanns Enzyklopädie der technischen Chemie, Vol. 18, p. 301 et seq. 1979; Houben-Weyl, Methoden der Organischen Chemie, Vol. 12/1, p. 43; Beilstein Vol. 6, p. 177).

The phosphorous-containing compound is present in the inventive composition in an amount of 2 to 20, preferably 5 to 15, particularly preferably 7 to 15, most preferably 10 to 13 percent relative to the weight of the composition.

Component D

Fluorinated polyolefins are known and are described, for example, in U.S. Pat. No. 5,672,645 incorporated herein by reference. They are marketed, for example, under the trademark Teflon®30N by DuPont.

The fluorinated polyolefins may be used in the pure form or in the form of a coagulated mixture of emulsions of the fluorinated polyolefins with emulsions of the graft polymers (component B) or with an emulsion of a copolymer, preferably based on styrene/acrylonitrile, the fluorinated polyolefin being mixed as an emulsion with an emulsion of the graft polymer or of the copolymer and the mixture then being coagulated. The fluorinated polyolefins may be mixed as powders with a powder or granules of the graft polymer or copolymer and the mixture then compounded in the melt in conventional units, such as internal kneaders, extruders or twin-screw extruders.

The fluorinated polyolefins may also be used in the form of a master batch, which is prepared by emulsion polymerization of at least one mono ethylenically unsaturated monomer in the presence of an aqueous dispersion of the fluorinated polyolefin. Preferred monomer components are styrene, acrylonitrile and mixtures thereof. The polymer is employed as a free-flowing powder, after acidic precipitation and subsequent drying.

The coagulates, pre-compounds or master batches conventionally have solids contents of fluorinated polyolefin of 5 to 95 wt. %, preferably 7 to 60 wt. %.

Component D may be contained in the composition according to the invention in an amount of preferably 0.1 to 2, preferably 0.2 to 1 and most preferably 0.2 to 0.5 percent relative to the total weight of the composition.

Component E

Component E is an inorganic boron compound with elements of the 6th Main Group of the Periodic Table, preferably with oxygen. Preferred oxygen-containing boron compounds are metal salts of the borates, in which case the oxygen-containing boron compound may be present as orthoborate, metaborate, hydroxoborate or polyborate. Examples include boric acid, boron oxide and borates. The borates include zinc borates such as zinc tetraborate, zinc metaborate and basic zinc borate, barium borates such as barium orthoborate, barium metaborate, barium diborate and barium tetraborate, lead borate, cadmium borate and magnesium borate. Metals of the 1st to 5th Main Groups or of the 1st to 8th Subgroups of the Periodic Table, preferably metals of the 1st and 2nd Main Groups or of the 1st and 2nd Subgroups of the Periodic Table, act as counter ions of the borates; preferred are Li$_3$[BO$_3$], Li[BO$_2$], Li[B(OH)$_4$], Na$_3$[B$_3$O$_6$], Na$_2$B$_4$O$_7$.4 H$_2$O, Na$_2$B$_4$O$_7$.10H$_2$O, NaCaB$_5$O$_9$.6H$_2$O, K$_3$[B$_3$O$_6$], KB$_5$O$_8$.4H$_2$O, Mg$_3$[BO$_3$]$_2$, Ca[BO$_3$]$_2$, Ca[BO$_2$]$_2$, CaB$_4$O$_7$.4H$_2$O, Ca$_2$B$_6$O$_{11}$.5H$_2$O, Ca$_2$B$_6$O$_{11}$.7H$_2$O, Ca$_4$B$_{10}$O$_{19}$.7H$_2$O, Ca$_5$B$_{12}$O$_{23}$.9H$_2$O, Sr[BO$_2$]$_2$, Ba$_3$[B$_3$O$_6$]$_2$, Cu$_3$[BO$_3$]$_2$, Zn$_3$[BO$_3$]$_2$, Zn$_2$B$_6$O$_{11}$, Zn$_4$B$_2$O$_7$.H$_2$O, Zn$_2$B$_6$O$_{11}$.3.5H$_2$O and ZnB$_4$O$_7$.4H$_2$O. Other suitable zinc borate hydrate include Zn$_4$B$_2$O$_7$.H$_2$O, Zn$_2$B$_6$O$_{11}$.3.5H$_2$O and ZnB$_4$O$_7$.4H$_2$O.

The boron compounds may be used singly or as mixtures.

The preferred boron compound is Zinc borate. The preferred zinc borate conforms to mZnO.nB2O3.xH2O where the ratio of x/m/n is around 0-7/1-5/2-6. The preferred zinc borate is well known and commercially available.

The median particle diameter ($d_{50}$) of the boron compound is 1 nm to 20 μm, preferably 0.1 μm to 15 μm, and particularly preferably 0.5 μm-12 μm.

Other Components

The inventive composition may include an optional styrenic copolymer, preferably styrene-acrylonitrile (SAN) at an amount of up to 50, preferably 10 to 30 pbw. The inventive composition may further include effective amounts of any of the additives known for their function in the context of thermoplastic polycarbonate molding compositions. These include any one or more of lubricants, mold release agents, for example pentaerythritol tetrastearate, nucleating agents, antistatic agents, thermal stabilizers, light stabilizers, hydrolytic stabilizers, fillers and reinforcing agents, colorants or pigments, as well as further flame retarding agents, other drip suppressants or a flame retarding synergists.

The inventive composition may be produced by conventional procedures using conventional equipment. It may be used to produce moldings of any kind by thermoplastic processes such as injection molding, extrusion and blow molding methods. The Examples which follow are illustrative of the invention.

EXAMPLES

In the preparation of exemplified compositions, the components and additives were melt compounded in a twin screw extruder ZSK 30 at a temperature profile from 200° C. to 300° C. The pellets obtained were dried in a forced air convection oven at 90° C. for 4 to 6 hours. The parts were injection molded at temperatures equal to or higher than 240° C. and mold temperature of about 75° C.

In preparing the compositions described below the following components were used:

Polycarbonate: a bisphenol-A based linear homopolycarbonate having melt flow rate of about 4 g/10 min (at 300° C., 1.2 kg) per ASTM D 1238(Makrolon 3108, a product of Bayer Material Science LLC)

Graft (co)polymer: methyl methacrylate (MMA) shell—grafted on to a core of siloxane(Si)-butyl acrylate (BA) composite rubber. The weight ratio of Si/BA/MMA is 80/10/10.

Phosphorous compound (designated P-compound): conforming to

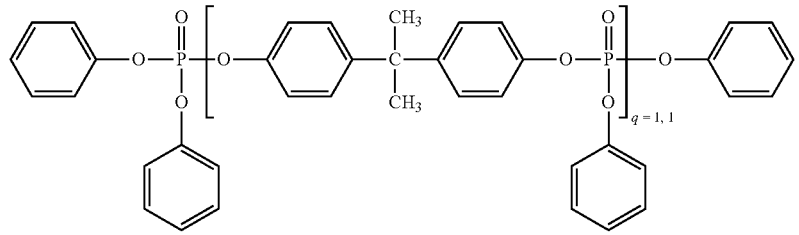

All exemplified compositions contained 0.4 phr fluorinated polyolefin (PTFE) introduced in the form of SAN-encapsulated PTFE in free-flowing powder form, containing 50 pbw PTFE (designated in the table as PTFE-SAN).

The boron compound used in the exemplified compositions (designated in the table as B-compound) was zinc borate in powder form having median particle size of 2 to 10 microns.

Each of the exemplified compositions further included the following conventional additives: about 0.1 wt. % thermal stabilizer, 0.4 wt. % lubricant and 0.5 wt. % aluminium oxide hydroxide. These additives are believed to have no criticality in the context of the inventive composition.

The melt flow rates (MFR) of the compositions were determined in accordance with ASTM D-1238 at 240° C., 5 Kg load.

The notched impact strength (NI) was determined at room temperature (about 23° C.) in accordance with ASTM D-256 using specimens ⅛" in thickness. Failure mode was determined by observation; accordingly "D" means ductile failure and D/B means ductile/brittle failure.

Instrumental Impact strength was determined at room temperature in accordance with ASTM D3763 using specimens ⅛".

The flammability rating was determined according to UL-94 on specimens 1.5 mm thick and 0.75 mm thick. Flammability rating in accordance with UL94 5V protocol has also been performed on plaques measuring 6"×6"×2.3 mm thick.

TABLE 1

|  | Example | | | |
|---|---|---|---|---|
|  | 1 | 2 | 3 (com.) | 4 (com.) |
| Component A: Polycarbonate, wt. % | 78.5 | 78.2 | 78.0 | 80.7 |
| Component B: Graft copolymer, wt. % | 5.75 | 6.0 | 6.25 | 7 |
| Component C: P-compound, wt. % | 12.5 | 12.5 | 12.5 | 8.5 |
| Component D: PTFE-SAN | 0.8 | 0.8 | 0.8 | 0.8 |
| Component E: B-compound, wt % | 1.48 | 1.48 | 1.48 | 2.0 |
| Properties |  |  |  |  |
| MFR, g/10 min | 11.1 | 10.5 | 10.9 | 2.0 |
| Impact Strength, notched Izod@23° C., ⅛", ft-lb/in | 10.0 | 11.2 | 11.4 | 13.8 |
| Instrumental Impact strength, ⅛" @ room temperature, Energy @total, ft·lb | 36.5/D[a] | 37.9/D[a] | 38.9/D[a] | 22.4 DB[a] |
| Flammability, UL94 @ 1.5 mm | V-0 | V-0 | V-0 | Failed |

TABLE 1-continued

|  | Example | | | |
|---|---|---|---|---|
|  | 1 | 2 | 3 (com.) | 4 (com.) |
| Flammability, UL 5 V @ 2.3 mm | 5A | 5A | 5B | 5A |

[a]D - indicates ductile break;
DB - indicates ductile-brittle break

Examples 1 and 2 that represent the invention show a combination of exceptional flame resistance and impact performance. Examples 3 and 4 are comparative examples exhibiting inferior properties that point to the criticality of the claimed relative amounts of the components.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) 50 to 95 percent linear aromatic (co)polycarbonate
   B) 1 to 15 percent graft (co)polymer having a core-shell morphology, including a grafted shell that consists of polymerized alkyl(meth)acrylate and a composite rubber core that contains interpenetrated and inseparable polyorganosiloxane and poly(meth)alkylacrylate components, wherein the weight ratio of polyorganosiloxane/poly(meth)alkylacrylate/rigid shell is 70-90/5-15/5-15,
   C) 2 to 20 percent phosphorous-containing flame retarding compound,
   D) 0.1 to 2 percent fluorinated polyolefin and
   E) 0.1 to 15 percent boron compound
said percent, all occurrences being relative to the total weight of A), B), C), D), and E), the composition characterized in that it contains no polyalkylene terephthalate.

2. The composition according to claim 1, wherein said A) is present in an amount of 65 to 90 percent, B) is present in an amount of 3 to 12 percent, C) is present in an amount of 5 to 15 percent, D) is present in an amount of 0.2 to 1 percent and said E) is present in an amount of 1 to 7 percent.

3. The composition according to claim 1, wherein said A) is a homopolycarbonate based on bisphenol A.

4. The composition of claim 1 wherein said weight ratio is 75-85/7-12/7-12.

5. The composition of claim 1 wherein said weight ratio is 80/10/10.

6. The composition of claim 1 wherein the rubber core is in particulate form having median particle she of 0.05 to 5 micron.

7. The composition of claim 1, wherein said C) conforms to formula (IV)

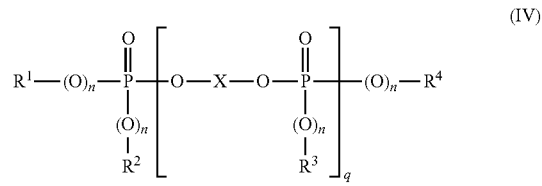

wherein
   $R^1$, $R^2$, $R^3$ and $R^4$ each independently of the others represents $C_{1-8}$alkyl, or $C_{5-6}$-cycloalkyl, $C_{6-20}$-aryl or $C_{7-12}$-aralkyl each optionally substituted by alkyl,
   n independently of each other is 0 or 1,
   q denotes 0.5 to 30, and
   X is a mono- or poly-nuclear aromatic radical having 6 to 30 carbon atoms, or a linear or branched aliphatic radical having 2 to 30 carbon atoms, which may be OH-substituted and may contain up to 8 ether bonds.

8. The composition according to claim 1 further containing at least one member selected from the group consisting of styrenic copolymer, lubricant, mold-release agent, nucleating agent, antistatic, thermal stabilizer, hydrolytical stabilizer, light stabilizer, colorant, pigment, filler, reinforcing agent, flameproofing agent other than component C), and flameproofing synergist.

9. The composition of claim 1 wherein said boron compound is zinc borate.

* * * * *